US012327372B2

(12) United States Patent
Ohno

(10) Patent No.: US 12,327,372 B2
(45) Date of Patent: Jun. 10, 2025

(54) EYE GAZE DETECTION METHOD, EYE GAZE DETECTION DEVICE, AND NON-TRANSITORY COMPUTER READABLE STORAGE MEDIUM

(71) Applicants: Swallow Incubate Co., Ltd., Ibaraki (JP); Panasonic Holdings Corporation, Osaka (JP)

(72) Inventor: Toshikazu Ohno, Ibaraki (JP)

(73) Assignees: Swallow Incubate Co., Ltd., Ibaraki (JP); Panasonic Holdings Corporation, Osaka (JP)

( * ) Notice: Subject to any disclaimer, the term of this patent is extended or adjusted under 35 U.S.C. 154(b) by 573 days.

(21) Appl. No.: 17/741,632

(22) Filed: May 11, 2022

(65) Prior Publication Data

US 2022/0270287 A1 Aug. 25, 2022

Related U.S. Application Data

(63) Continuation of application No. PCT/JP2020/004552, filed on Feb. 6, 2020.

(30) Foreign Application Priority Data

Nov. 13, 2019 (JP) ................................. 2019-205364

(51) Int. Cl.
*G06T 7/73* (2017.01)
*G06V 40/16* (2022.01)

(52) U.S. Cl.
CPC .............. *G06T 7/73* (2017.01); *G06V 40/161* (2022.01); *G06V 40/171* (2022.01); *G06T 2207/30201* (2013.01)

(58) Field of Classification Search
CPC ... G06T 7/73; G06T 2207/30201; G06T 1/00; G06V 40/161; G06V 40/171; G06V 40/193; G06V 40/165
See application file for complete search history.

(56) References Cited

U.S. PATENT DOCUMENTS

2009/0109400 A1* 4/2009 Yoshinaga .............. G06F 3/013
 351/210
2012/0218398 A1* 8/2012 Mehra .................. G06V 40/176
 348/78

(Continued)

FOREIGN PATENT DOCUMENTS

JP 61-172552 8/1986
JP 2003-271932 9/2003

(Continued)

OTHER PUBLICATIONS

First Examination Report issued Apr. 22, 2024 in corresponding Indian Patent Application No. 202247027635, with English language translation.

(Continued)

*Primary Examiner* — Phuoc Tran
(74) *Attorney, Agent, or Firm* — Wenderoth, Lind & Ponack, L.L.P.

(57) ABSTRACT

An eye gaze detection method includes: acquiring image data of a face of a person; detecting, from the image data, a left eye region including a left eye of the person and a right eye region including a right eye of the person; detecting, from the image data of the face, at least one of an ear region including an ear of the person and a hair region including hair of the person, when only one eye region of the right eye region or the left eye region is detected; detecting information indicating an orientation of the face based on information indicating a position of one eye included in the one eye region and information indicating the at least one; and detecting information indicating an eye gaze of the person based on the information indicating the position of the one eye and the information indicating the orientation of the face.

7 Claims, 14 Drawing Sheets

(56) References Cited

U.S. PATENT DOCUMENTS

| | | | |
|---|---|---|---|
| 2016/0210503 A1* | 7/2016 | Yin | G06V 40/19 |
| 2017/0286771 A1 | 10/2017 | Ishii et al. | |
| 2020/0246690 A1* | 8/2020 | Weitzman | A63F 13/816 |
| 2020/0372677 A1* | 11/2020 | Yoon | G06V 40/193 |

FOREIGN PATENT DOCUMENTS

| | | |
|---|---|---|
| JP | 2009-104524 | 5/2009 |
| JP | 2010-81260 | 4/2010 |

OTHER PUBLICATIONS

International Search Report issued Apr. 7, 2020 in International (PCT) Application No. PCT/JP2020/004552.

\* cited by examiner

EYE GAZE DETECTION METHOD, EYE GAZE DETECTION DEVICE, AND NON-TRANSITORY COMPUTER READABLE STORAGE MEDIUM

TECHNICAL FIELD

The present disclosure relates to a technique of detecting an eye gaze of a person.

BACKGROUND ART

The eye gaze detection technique is used in various applications such as estimation of a person's interest target, estimation of a person's state such as drowsiness, and a user interface that performs input to equipment by an eye gaze. The eye gaze detection technique is roughly divided into a head-mounted type and a non-contact type. The head-mounted type eye gaze detection technique is a technique of detecting an eye gaze by mounting a device such as a head-mounted display on the head of a person. The non-contact type eye gaze detection technique is a technique of detecting an eye gaze without mounting a device to a person. The non-contact type eye gaze detection technique does not require attachment of a device to the head unlike the head-mounted type eye gaze detection technique. Hence, there are advantages such as not annoying a person and not blocking the field of view of a person. Therefore, the present disclosure focuses on the non-contact type eye gaze detection technique.

Here, the non-contact type eye gaze detection technique is roughly divided into two methods of a pupillary and corneal reflection method and a method using a three-dimensional eyeball model. The pupillary and corneal reflection method is a method of irradiating human eyes with light by a light-emitting element, and detecting an eye gaze by a position of a reflection image projected on the eyes, an irradiation angle of the light, a movement amount of the position of the reflection image, and the like, as described in Patent Literature 1, for example.

A method by the three-dimensional eyeball model is a method of estimating the eye gaze direction based on the information regarding the eyeball obtained by analyzing a face image. For example, Patent Literature 2 discloses a method of estimating an eye gaze direction from a rotation angle of an eyeball and a face orientation obtained by analyzing a face image. In addition, a method of estimating, as an eye gaze direction, a three-dimensional vector connecting an eyeball center position and an iris center position obtained by analyzing a face image, and estimating, as an eye gaze direction, a normal to a tangent plane of a pupil center position is also known.

However, in the non-contact type eye gaze detection technique, it becomes difficult to accurately detect the eye gaze direction in a case where a face image indicating one side of the face is used, in other words, in a case where only one eye can be detected from the face image. Therefore, there is a problem that it becomes difficult to determine the eye gaze level and the presence/absence of looking aside based on the eye gaze information of a pedestrian with respect to an object installed on the side with respect to the travel direction of the pedestrian, for example. In the non-contact type eye gaze detection technique disclosed in Patent Literatures 1 and 2 described above, an eye gaze detection method in a case where only one eye can be detected is not specifically considered.

CITATION LIST

Patent Literature

Patent Literature 1: JP S61-172552 A
Patent Literature 2: JP 2003-271932 A

SUMMARY OF INVENTION

The present disclosure has been made to solve such a problem, and an object thereof is to further improve detection accuracy of an eye gaze in a case where only one eye can be detected from a face image.

A first aspect of the present disclosure is an eye gaze detection method in an eye gaze detection device, the eye gaze detection method including: acquiring image data of a face of a person; detecting, from the image data of the face, a left eye region including a left eye of the person and a right eye region including a right eye of the person; detecting, from the image data of the face, at least one of an ear region including an ear of the person and a hair region including hair of the person, when only one eye region of the right eye region or the left eye region is detected; detecting information indicating an orientation of the face based on information indicating a position of one eye included in the one eye region and information indicating at least one of a position of an ear included in the ear region and a position of hair included in the hair region; and detecting information indicating an eye gaze of the person based on the information indicating the position of the one eye and the information indicating the orientation of the face.

A second aspect of the present disclosure is an eye gaze detection method in an eye gaze detection device, the eye gaze detection method including: acquiring image data of a face of a person; detecting, from the image data of the face, a left eye region including a left eye of the person and a right eye region including a right eye of the person; when the right eye region and the left eye region are detected, detecting information indicating an orientation of the face from the image data of the face, and detecting information indicating an eye gaze of the person by first processing using information indicating a position of a right eye included in the right eye region and information indicating a position of a left eye included in the left eye region and information indicating an orientation of the face; and when only one eye region of the right eye region or the left eye region is detected, based on information indicating a position of one eye included in the one eye region and information indicating a position of a site on the face different from an eye, detecting information indicating an orientation of the face, and detecting information indicating an eye gaze of the person by second processing using the information indicating the position of the one eye and the information indicating the orientation of the face.

Figure 1:
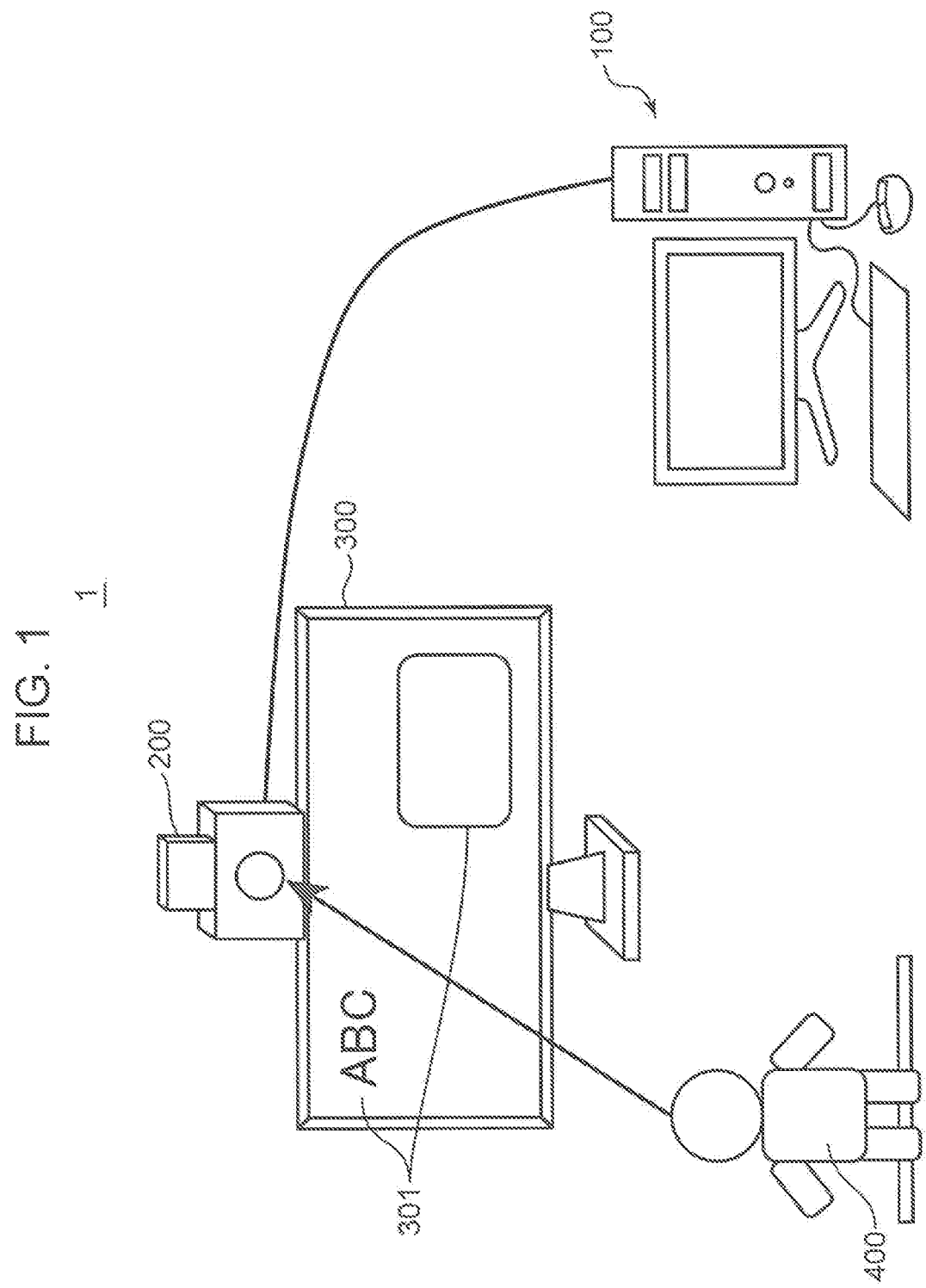
FIG. 1 is a view showing an example of an overall configuration of an image processing system according to a first embodiment of the present disclosure.

DESCRIPTION OF EMBODIMENTS (Findings Underlying Present Disclosure)

In an eye gaze detection method by a conventional three-dimensional eyeball model, information regarding eyeballs of both eyes is detected by analyzing a face image, and an eye gaze direction is estimated based on the detected information. However, there is a case where a detection target person looks aside, and thus a face image including only one eye is used for eye gaze detection. In this case, one eye that can be detected from the face image and one eye that cannot be detected from the face image are estimated to be oriented in substantially the same direction.

Thus, in the eye gaze detection method by the conventional three-dimensional eyeball model, it is difficult to accurately detect the eye gaze direction when only a face image indicating one side of the face can be detected. If the eye gaze direction cannot be accurately detected, it becomes difficult to determine the eye gaze level and the presence/absence of looking aside based on the eye gaze information of a pedestrian with respect to an object installed on the side with respect to the travel direction of the pedestrian, for example.

As a result of conducting detailed studies on such a problem, the present inventor has obtained a finding that it is possible to improve the accuracy of eye gaze detection by using information regarding a site different from the eye in a case where only one eye can be detected from a face image, and the present inventor has conceived of the following aspects.

An eye gaze detection method according to a first aspect of the present disclosure is an eye gaze detection method in an eye gaze detection device, the eye gaze detection method including: acquiring image data of a face of a person; detecting, from the image data of the face, a left eye region including a left eye of the person and a right eye region including a right eye of the person; detecting, from the image data of the face, at least one of an ear region including an ear of the person and a hair region including hair of the person, when only one eye region of the right eye region or the left eye region is detected; detecting information indicating an orientation of the face based on information indicating a position of one eye included in the one eye region and information indicating at least one of a position of an ear included in the ear region and a position of hair included in the hair region; and detecting information indicating an eye gaze of the person based on the information indicating the position of the one eye and the information indicating the orientation of the face.

According to the present configuration, when only one eye region of the right eye region or the left eye region is detected from the image data of the face, at least one of the ear region and the hair region is detected from the image data of the face. Then, the information indicating the orientation of the face is detected based on the information indicating the position of one eye included in the one eye region and the information indicating the position of the ear or the hair included in at least one of the detected ear region and hair region. Then, information indicating an eye gaze of a person is detected based on the information indicating the detected face orientation and the information indicating the position of the one eye.

Thus, even in a case where only the image data of the face including only the right eye or the left eye can be acquired, the present configuration can accurately detect the orientation of the face based on the positional relationship between the detected one eye and ear or hair instead of the positional relationship between both eyes. As a result, the present configuration can accurately specify the orientation of the face, even in a case where only one eye can be detected from the face image, and can eventually improve the eye gaze detection accuracy.

In the above aspect, the method may include detecting the ear region from the image data of the face when only the one eye region is detected, and detecting information indicating an orientation of the face based on the information indicating the position of the one eye and the information indicating the position of the ear when the ear region has been detected.

According to the present configuration, when only one eye region of the right eye region or the left eye region is detected from the image data of the face, the ear region is detected from the image data of the face, and the information indicating the orientation of the face is detected based on the information indicating the position of one eye included in the one eye region and the information indicating the position of an ear included in the detected ear region. Thus, even in a case where only one eye can be detected from the face image, the present configuration can accurately detect the orientation of the face based on the positional relationship between the one eye and ear instead of the positional relationship between both eyes.

In the above aspect, the method may include detecting the hair region from the image data of the face when having failed to detect the ear region, and detecting information indicating an orientation of the face based on the information indicating the position of the one eye and the information indicating the position of the hair.

According to the present configuration, when only one eye region of the right eye region or the left eye region is detected from the image data of the face, the hair region is detected from the image data of the face, and the information indicating the orientation of the face is detected based on the information indicating the position of one eye included in the one eye region and the information indicating the position of hair included in the detected hair region. Thus, even in a case where only one eye can be detected from the face image, the present configuration can accurately detect the orientation of the face based on the positional relationship between the one eye and hair instead of the positional relationship between both eyes.

In the above aspect, the method may include detecting a contour point indicating a point on a contour of the face existing on an inner corner of the one eye relative to a position of an outer corner of the one eye based on the image data of the face and the information indicating the position of the one eye, and detecting information indicating an orientation of the face based on a first distance from a position of the one eye to the contour point and a second distance from a position of the one eye to a position of the ear.

According to the present configuration, information indicating the orientation of the face is detected based on the first distance from the position of the one eye to the contour point indicating the point on the contour of the face existing on the inner corner of the one eye relative to the position of the outer corner of the one eye, and the second distance from the position of the one eye to the position of the ear. Thus, the present configuration can accurately detect the orientation of the face based on the width of the face on the inner corner side of the eye relative to the detected one eye, which is indicated by the first distance, and the width of the face on the ear side relative to the detected one eye, i.e., the outer corner side of the eye, which is indicated by the second distance.

In the above aspect, the method may include detecting a contour point indicating a point on a contour of the face existing on an inner corner of the one eye relative to a position of an outer corner of the one eye based on the image data of the face and the information indicating the position of the one eye, and detecting information indicating an orientation of the face based on a first distance from a position of the one eye to the contour point and a third distance from a position of the one eye to a point in the hair region positioned on an outer corner side relative to a position of an inner corner of the one eye.

According to the present configuration, information indicating the orientation of the face is detected based on the first distance from the position of the one eye to the contour point indicating the point on the contour of the face existing on the inner corner of the one eye relative to the position of the outer corner of the one eye, and the third distance from the position of the one eye to a point in the hair region positioned on the outer corner side relative to the position of the inner corner of the one eye. Thus, the present configuration can accurately detect the orientation of the face based on the width of the face on the inner corner side of the eye relative to the detected one eye, which is indicated by the first distance, and the width of the face on the outer corner side of the eye relative to the detected one eye, which is indicated by the third distance.

In the above aspect, the method may include detecting information indicating an orientation of the face from the image data of the face when the right eye region and the left eye region are detected, and detecting information indicating an eye gaze of the person based on information indicating a position of a right eye included in the right eye region and a position of a left eye included in the left eye region and the information indicating the orientation of the face.

According to the present configuration, when the right eye region and the left eye region are detected from the image data of the face, information indicating the orientation of the face is detected from image data of the face. Then, information indicating an eye gaze of a person is detected based on the information indicating the detected face orientation and the information indicating the position of both eyes. Thus, in a case where both eyes can be detected from the face image, the present configuration is capable of detecting the eye gaze from the position of both eyes and the orientation of the face that are obtained from image data of the face.

An eye gaze detection method according to a second aspect of the present disclosure is an eye gaze detection method in an eye gaze detection device, the eye gaze detection method including: acquiring image data of a face of a person; detecting, from the image data of the face, a left eye region including a left eye of the person and a right eye region including a right eye of the person; when the right eye region and the left eye region are detected, detecting information indicating an orientation of the face from the image data of the face, and detecting information indicating an eye gaze of the person by first processing using information indicating a position of a right eye included in the right eye region and information indicating a position of a left eye included in the left eye region and information indicating an orientation of the face; and when only one eye region of the right eye region or the left eye region is detected, based on information indicating a position of one eye included in the one eye region and information indicating a position of a site on the face different from an eye, detecting information indicating an orientation of the face, and detecting information indicating an eye gaze of the person by second processing using the information indicating the position of the one eye and the information indicating the orientation of the face.

According to the present configuration, when the right eye region and the left eye region are detected from the image data of the face, information indicating the orientation of the face is detected from image data of the face. Then, information indicating an eye gaze of a person is detected by the first processing using the information indicating the detected face orientation and the information indicating the position of both eyes. Thus, in a case where both eyes can be detected from the face image, the present configuration is capable of detecting the eye gaze from the position of both eyes and the orientation of the face by performing the first processing.

On the other hand, when only one eye region of the right eye region or the left eye region is detected from the image data of the face, the information indicating the orientation of the face is detected based on the information indicating the position of one eye included in the one eye region and the information indicating the position of a site of the face different from an eye. Then, information indicating an eye gaze of a person is detected by the second processing using the information indicating the detected face orientation and the information indicating the position of the one eye. Thus, in a case where only one eye can be detected from the face image, the present configuration is capable of detecting the orientation of the face based on the positional relationship between a site different from the eye and the detected one eye, and detecting the eye gaze from the position of the detected one eye and the detected orientation of the face by performing the second processing.

Thus the present configuration is capable of appropriately detecting the eye gaze by switching the processing according to the number of eyes detected from the face image.

In the above aspect, the different site may be an ear or hair.

According to the present configuration, when only one eye region of the right eye region or the left eye region is detected from the image data of the face, the information indicating the orientation of the face is detected based on the information indicating the position of one eye included in the one eye region and the information indicating the position of the ear or the hair. Thus, even in a case where only one eye can be detected from the face image, the present configuration can accurately detect the orientation of the face based on the positional relationship between the detected one eye and ear or hair.

In the above aspect, the method may include detecting an ear region including an ear of the person from the image data of the face when only the one eye region is detected, and detecting information indicating an orientation of the face based on the information indicating the position of the one eye and the information indicating the position of an ear included in the ear region when the ear region has been detected.

According to the present configuration, when only one eye region of the right eye region or the left eye region is detected from the image data of the face, the ear region is detected from the image data of the face, and the information indicating the orientation of the face is detected based on the information indicating the position of one eye included in the one eye region and the information indicating the position of an ear included in the detected ear region. Thus, even in a case where only one eye can be detected from the face image, the present configuration can accurately detect the orientation of the face based on the positional relationship between the one eye and ear instead of the positional relationship between both eyes.

In the above aspect, the method may include detecting a hair region including hair of the person from the image data of the face when having failed to detect the ear region, and detecting information indicating an orientation of the face based on the information indicating the position of the one eye and the information indicating the position of hair included in the hair region.

According to the present configuration, when only one eye region of the right eye region or the left eye region is detected from the image data of the face, the hair region is detected from the image data of the face, and the information indicating the orientation of the face is detected based on the information indicating the position of one eye included in the one eye region and the information indicating the position of hair included in the detected hair region. Thus, even in a case where only one eye can be detected from the face image, the present configuration can accurately detect the orientation of the face based on the positional relationship between the one eye and hair instead of the positional relationship between both eyes.

In the above aspect, the method may include detecting a contour point indicating a point on a contour of the face existing on an inner corner of the one eye relative to a position of an outer corner of the one eye based on the image data of the face and the information indicating the position of the one eye, and detecting information indicating an orientation of the face based on a first distance from a position of the one eye to the contour point and a second distance from a position of the one eye to a position of the ear.

According to the present configuration, information indicating the orientation of the face is detected based on the first distance from the position of the one eye to the contour point indicating the point on the contour of the face existing on the inner corner of the one eye relative to the position of the outer corner of the one eye, and the second distance from the position of the one eye to the position of the ear. Thus, the present configuration can accurately detect the orientation of the face based on the width of the face on the inner corner side of the eye relative to the detected one eye, which is indicated by the first distance, and the width of the face on the ear side relative to the detected one eye, i.e., the outer corner side of the eye, which is indicated by the second distance.

In the above aspect, the method may include detecting a contour point indicating a point on a contour of the face existing on an inner corner of the one eye relative to a position of an outer corner of the one eye based on the image data of the face and the information indicating the position of the one eye, and detecting information indicating an orientation of the face based on a first distance from a position of the one eye to the contour point and a third distance from a position of the one eye to a point in the hair region positioned on an outer corner side relative to a position of an inner corner of the one eye.

According to the present configuration, information indicating the orientation of the face is detected based on the first distance from the position of the one eye to the contour point indicating the point on the contour of the face existing on the inner corner of the one eye relative to the position of the outer corner of the one eye, and the third distance from the position of the one eye to a point in the hair region positioned on the outer corner side relative to the position of the inner corner of the one eye. Thus, the present configuration can accurately detect the orientation of the face based on the width of the face on the inner corner side of the eye relative to the detected one eye, which is indicated by the first distance, and the width of the face on the outer corner side of the eye relative to the detected one eye, which is indicated by the third distance.

The present disclosure can also be implemented as a control program for causing a computer to execute each characteristic configuration included in such an eye gaze detection method, or an eye gaze detection system operated by this control program. Furthermore, it goes without saying that such a control program can be distributed via a computer-readable non-transitory recording medium such as a CD-ROM or a communication network such as the Internet.

Note that each of the embodiments described below shows a specific example of the present disclosure. Numerical values, shapes, constituent elements, steps, orders of steps, and the like shown in the following embodiments are merely examples, and are not intended to limit the present disclosure. Among the constituent elements in the following embodiments, constituent elements that are not described in independent claims indicating the highest concept are described as discretionary constituent elements. In addition, in all the embodiments, each of the contents can be combined.

First Embodiment

FIG. 1 is a view showing an example of an overall configuration of an image processing system 1 according to the first embodiment of the present disclosure. The image processing system 1 is a system that captures a person 400 and detects eye gaze information indicating an eye gaze of the person 400 from the obtained image data of the person 400. In the example of FIG. 1, the image processing system 1 specifies which object 301 the person 400 gazes at among a plurality of objects 301 displayed on a display device 300. However, this is an example, and the image processing system 1 may specify not only the object 301 displayed on the display screen of the display device 300 but also the object 301 gazed by the person 400 in the real space.

In the example of FIG. 1, the image processing system 1 is applied to a digital signage system. Therefore, the object 301 displayed on the display device 300 is an image of signage such as an advertisement.

The image processing system 1 includes an image processing device 100, a camera 200, and the display device 300. The image processing device 100 is connected to the camera 200 and the display device 300 via a predetermined communication path. The predetermined communication path is, for example, a wired communication path such as a wired LAN, or a wireless communication path such as a wireless LAN and Bluetooth (registered trademark). The image processing device 100 includes, for example, a computer installed around the display device 300. However, this is an example, and the image processing device 100 may include a cloud server. In this case, the image processing device 100 is connected to the camera 200 and the display device 300 via the Internet. The image processing device 100 detects eye gaze information of the person 400 from the image data of the person 400 captured by the camera 200, and outputs the eye gaze information to the display device 300. Furthermore, the image processing device 100 may be incorporated as hardware in the camera 200 or the display device 300. Furthermore, the camera 200 or the display device 300 may include a processor, and the image processing device 100 may be incorporated as software.

By capturing an image of an environment around the display device 300 at a predetermined frame rate, for example, the camera 200 acquires image data of the person 400 positioned around the display device 300. The camera 200 sequentially outputs the acquired image data to the image processing device 100 at a predetermined frame rate. The camera 200 may be a visible light camera or may be an infrared light camera. Furthermore, the camera 200 may be a visible light camera or an infrared light camera functionally provided in the display device 300 or electronic equipment such as a smartphone.

The display device 300 includes a display device such as a liquid crystal panel or an organic EL panel. In the example of FIG. 1, the display device 300 is a signage display. Note that in the example of FIG. 1, the image processing system 1 is described to include the display device 300, but this is an example, and another piece of equipment may be adopted instead of the display device 300. For example, if the image processing system 1 is used as a user interface that receives an input to equipment by an eye gaze, the image processing system 1 may adopt home appliances such as a refrigerator, a television set, and a washing machine instead of the display device 300, for example. For example, if the image processing system 1 is mounted on a vehicle, a vehicle such as an automobile may be adopted instead of the display device 300. In this case, the camera 200 may be a visible light camera or an infrared light camera functionally provided in a home appliance, a vehicle, or the like. Furthermore, a storage device such as a hard disk drive or a solid state drive may be adopted instead of the display device 300.

Figure 2:
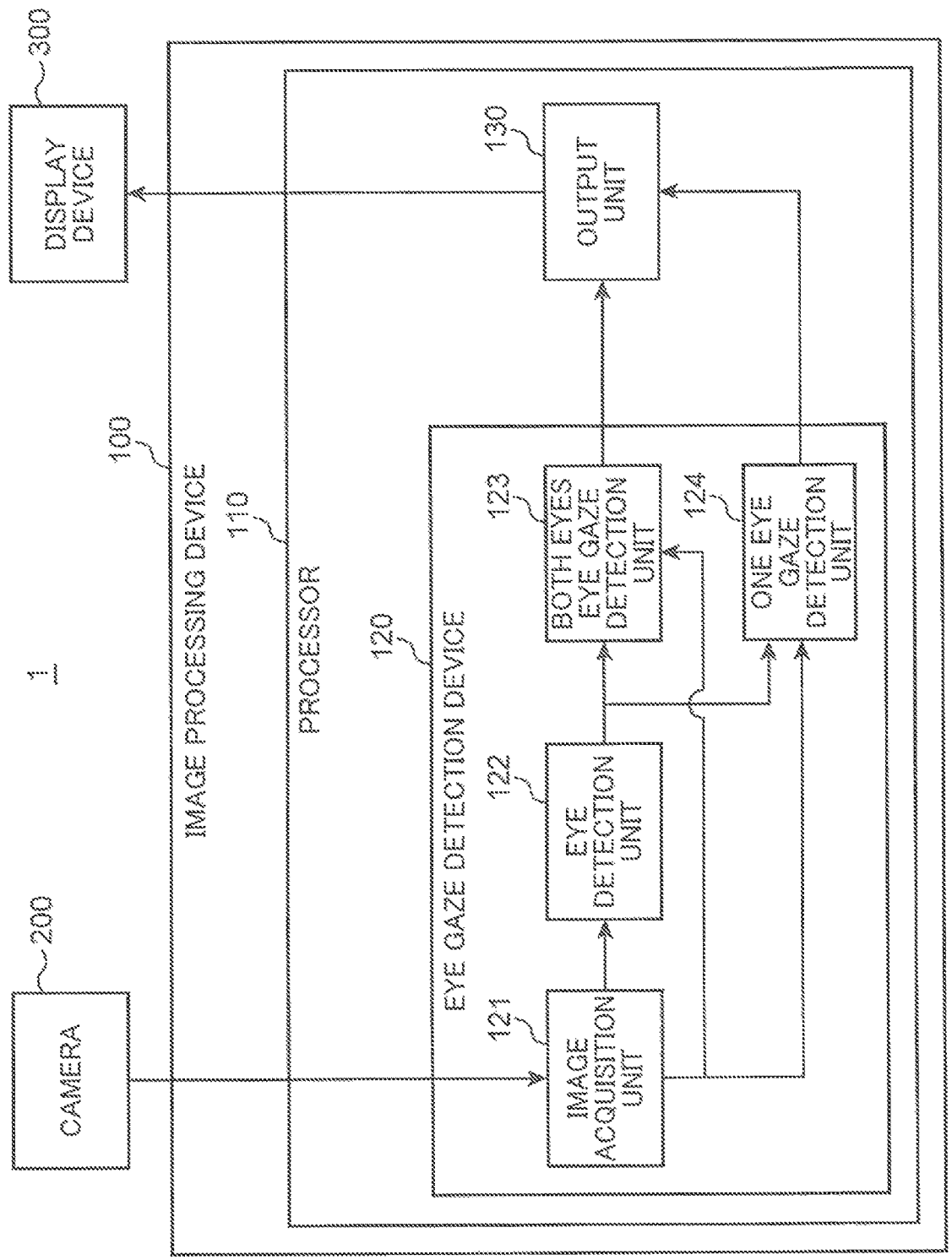
FIG. 2 is a block diagram showing an example of a detailed configuration of the image processing system according to the first embodiment.

FIG. 2 is a block diagram showing an example of a detailed configuration of the image processing system 1 according to the first embodiment. The image processing device 100 includes a processor 110. The processor 110 is an electric circuit such as a CPU or an FPGA. The processor 110 includes an eye gaze detection device 120 and an output unit 130.

The eye gaze detection device 120 includes an image acquisition unit 121, an eye detection unit 122, a both eyes gaze detection unit 123, and a one eye gaze detection unit 124. Note that each block included in the processor 110 may be implemented by the processor 110 executing a control program for causing a computer to function as an image processing device, or may be configured by a dedicated electric circuit.

The image acquisition unit 121 acquires image data captured by the camera 200. Here, the acquired image data includes the face of the person 400 (an example of the person) around the display device 300. Note that the image data acquired by the image acquisition unit 121 may be, for example, image data posted on a website or may be image data stored in an external storage device.

The eye detection unit 122 detects a left eye region including the left eye of the person 400 and a right eye region including the right eye of the person 400 from the image data acquired by the image acquisition unit 121. Hereinafter, the left eye region and the right eye region will be collectively referred to as an eye region. Specifically, the eye detection unit 122 is only required to detect the eye region using a classifier created in advance for detecting the eye region. The classifier used here is a Haar-like cascade classifier created in advance for detecting the eye region in an open-source image processing library, for example.

The eye region is a rectangular region having a size in which a predetermined margin is added to the size of the eye. However, this is an example, and the shape of the eye region may be, for example, a triangle, a pentagon, a hexagon, an octagon, or the like other than a rectangle. Note that the position at which the boundary of the eye region is set with respect to the eye depends on the performance of the classifier.

Figure 3:
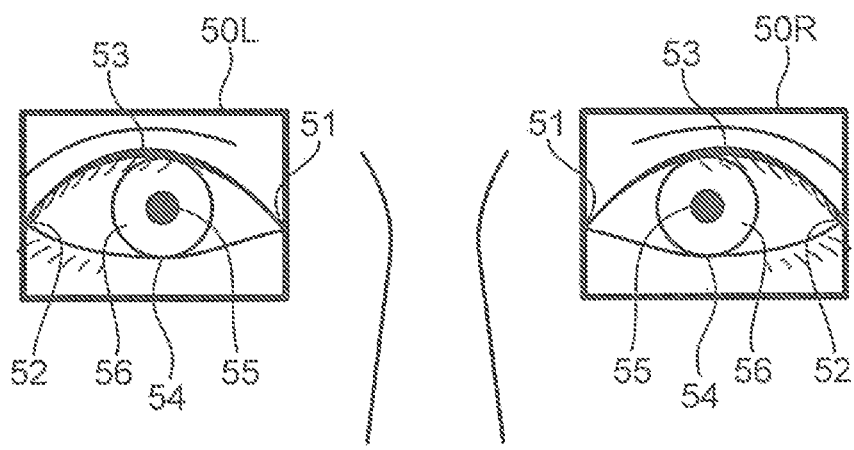
FIG. 3 is a view showing an example of a right eye region and a left eye region.

FIG. 3 is a view showing an example of a right eye region 50R and a left eye region 50L. In the present embodiment, the eye refers to a region including the white of the eye and a colored part such as the iris that are surrounded by a boundary 53 of the upper eyelid and a boundary 54 of the lower eyelid as shown in FIG. 3. As shown in FIG. 3, the colored part includes a pupil 55 and a donut-like iris 56 surrounding the pupil 55. Furthermore, in the present embodiment, for convenience of description, the right eye refers to the eye on the right side when the person 400 is viewed from the front, and the left eye refers to the eye on the left side when the person 400 is viewed from the front. FIG. 3 shows an example in which the eye detection unit 122 detects the right eye region 50R including the right eye and the left eye region 50L including the left eye. However, this is an example, and the eye on the right side as viewed from the person 400 may be the right eye and the eye on the left side as viewed from the person 400 may be the left eye. In the present embodiment, the direction on the right side of the paper surface is defined as the right side, and the direction on the left side of the paper surface is defined as the left side.

When the eye detection unit 122 detects the right eye region 50R and the left eye region 50L, the both eyes gaze detection unit 123 detects information indicating the orientation of the face (hereinafter, face orientation information) of the person 400 from the image data acquired by the image acquisition unit 121. Then, the both eyes gaze detection unit 123 detects information indicating the eye gaze (hereinafter, eye gaze information) of the person 400 by the first processing using the information indicating the position of the right eye included in the right eye region 50R and the information indicating the position of the left eye included in the left eye region 50L and the detected face orientation information.

Specifically, known eye gaze detection processing for detecting an eye gaze by a three-dimensional eyeball model is only required to be applied to the detection of the face orientation information and the first processing performed by the both eyes gaze detection unit 123. The both eyes gaze detection unit 123 is only required to detect the face orientation information from the image data acquired by the image acquisition unit 121 according to known eye gaze detection processing applied to detection of the face orientation information. The face orientation information includes an angle indicating the front direction of the face with respect to the optical axis of the camera 200, for example. The both eyes gaze detection unit 123 is only required to acquire information indicating the positions of the right eye and the left eye from the right eye region 50R and the left eye region 50L detected by the eye detection unit 122 according to known eye gaze detection processing applied as the first processing. The information indicating the position of the right eye includes, for example, the positions of the colored part of the right eye, the pupil of the right eye, the inner corner of the right eye, the outer corner of the right eye, and the center of gravity of the right eye. Similarly, the information indicating the position of the left eye includes, for example, the positions of the colored part of the left eye, the pupil of the left eye, the inner corner of the left eye, the outer corner of the left eye, and the center of gravity of the left eye.

The eye gaze information may include a vector three-dimensionally indicating the direction of the eye gaze of the person 400, or may include coordinate data of an eye gaze point on a predetermined target plane (e.g., the display device 300). The eye gaze point is, for example, a position at which the target plane and the vector indicating the eye gaze intersect.

When the eye detection unit 122 detects only one eye region 50 of the right eye region 50R or the left eye region 5OL, the one eye gaze detection unit 124 detects the face orientation information based on the information indicating the position of one eye included in the one eye region 50 and the information indicating the position of a site of the face of the person 400 different from the eye. Then, the one eye gaze detection unit 124 detects the eye gaze information by the second processing using the information indicating the position of the one eye and the detected face orientation information. The site different from the eye includes, for example, an ear or hair. Details of the one eye gaze detection unit 124 will be described later.

The output unit 130 outputs, to the display device 300, the eye gaze information detected by the both eyes gaze detection unit 123 and the one eye gaze detection unit 124. The output unit 130 may acquire information of the object 301 displayed on the display device 300, specify the object 301 (hereinafter, gaze object) at which the person 400 gazes from the acquired information and the coordinate data of the eye gaze point, and output the specification result to the display device 300.

Since the camera 200 has been described with reference to FIG. 1, the description thereof is omitted here.

The display device 300 displays a marker indicating the eye gaze information output from the output unit 130, for example. The display device 300 may display a marker indicating the object 301 gazed by the person 400 output from the output unit 130, for example.

For example, it is assumed that coordinate data of the eye gaze point is output to the display device 300 as eye gaze information. In this case, the display device 300 performs such as processing of displaying, at a position corresponding to the coordinate data, a marker indicating the eye gaze position superimposed on the screen being displayed. For example, it is assumed that a specification result of the eye gaze object is output to the display device 300. In this case, the display device 300 may perform such as processing of displaying a marker indicating the eye gaze object superimposed on the screen being displayed.

Note that, in a case where the image processing system 1 includes a home appliance instead of the display device 300, the home appliance receives an input of the person 400 from the eye gaze information. Furthermore, in a case where the image processing system 1 includes a storage device instead of the display device 300, the storage device stores the eye gaze information. In this case, the storage device may store the eye gaze information in association with a time stamp.

Figure 4:
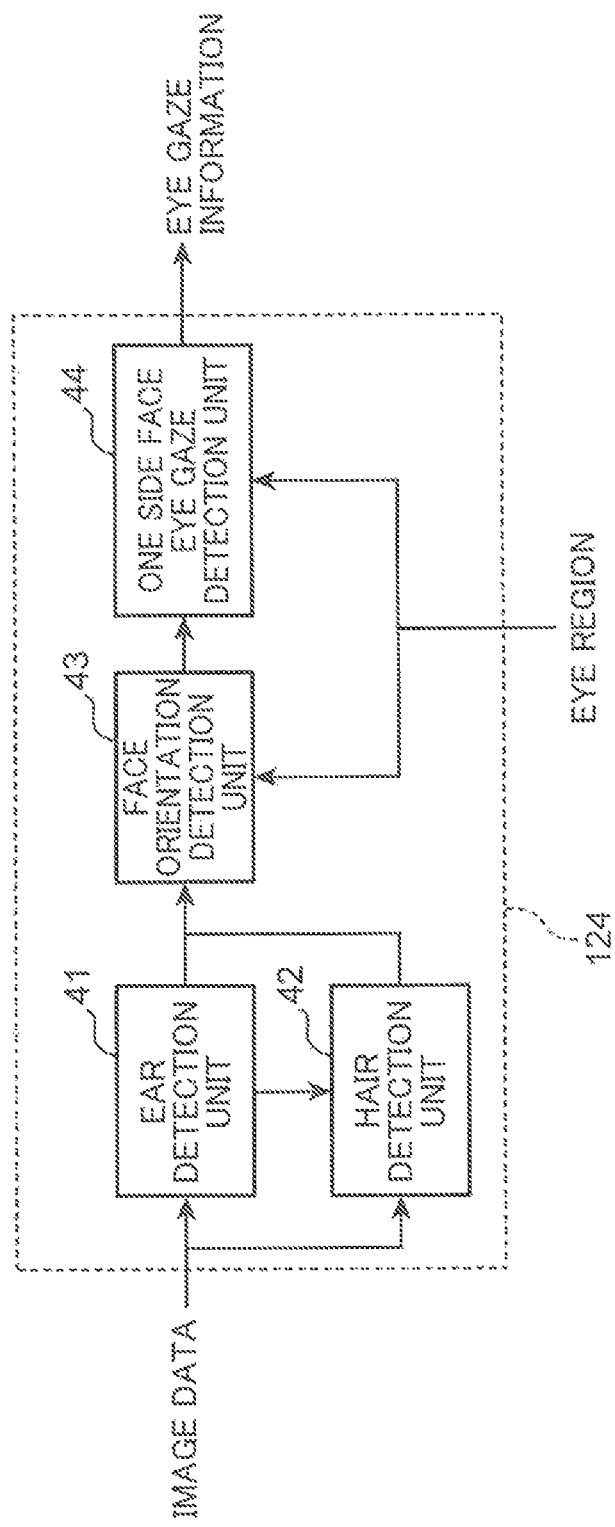
FIG. 4 is a block diagram showing an example of a detailed configuration of a one eye gaze detection unit.

Next, details of the one eye gaze detection unit 124 will be described. FIG. 4 is a block diagram showing an example of a detailed configuration of the one eye gaze detection unit 124. As shown in FIG. 4, the one eye gaze detection unit 124 includes an ear detection unit 41 (an example of the site detection unit), a hair detection unit 42 (an example of the site detection unit), a face orientation detection unit 43, and a one side face eye gaze detection unit 44 (an example of the eye gaze detection unit).

The ear detection unit 41 detects a right ear region including the right ear of the person 400 and a left ear region including the left ear of the person 400 from the image data acquired by the image acquisition unit 121. Specifically, the ear detection unit 41 is only required to detect the right ear region using a right ear classifier created in advance for detecting the region including the right ear of the person 400, and is only required to detect the left ear region using a left ear classifier created in advance for detecting the region including the left ear of the person 400. The right-ear classifier and the left-ear classifier used here are Haar-like cascade classifiers created in advance for detecting each of the right-ear region and the left-ear region in an open-source image processing library, for example. Hereinafter, the left ear region and the right ear region will be collectively referred to as an ear region.

The ear region is a rectangular region having a size about the size of an ear. However, this is an example, and the shape of the ear region may be, for example, a triangle, a pentagon, a hexagon, an octagon, or the like other than a rectangle. Note that the position at which the boundary of the ear region is set with respect to the ear depends on the performance of the classifier.

Figure 5:
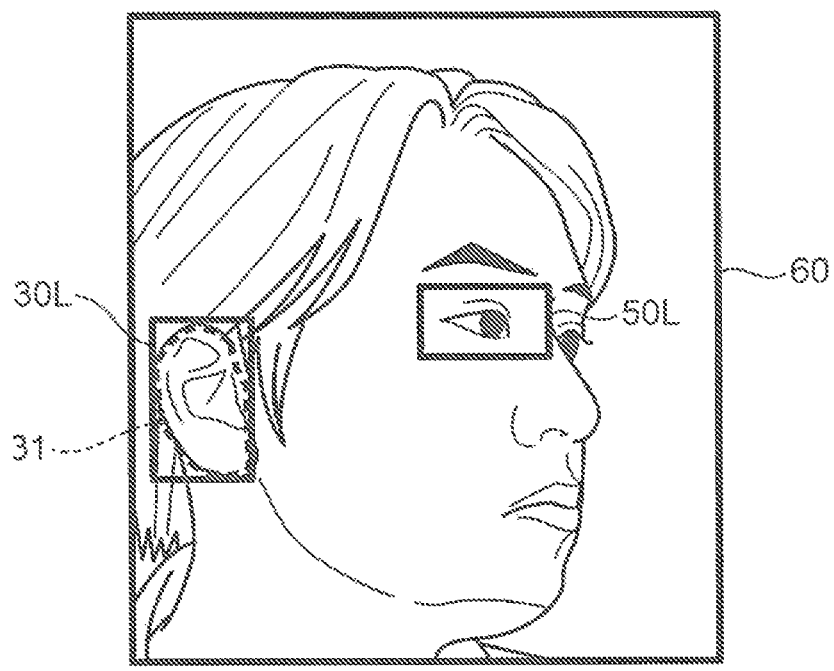
FIG. 5 is a view showing an example of an ear region.

FIG. 5 is a view showing an example of an ear region 30. As shown in FIG. 5, in the present embodiment, the ear refers to a region indicating the auricle enclosed by a broken line 31. Furthermore, in the present embodiment, for convenience of description, the right ear refers to the ear on the right side when the person 400 is viewed from the front, and the left ear refers to the ear on the left side when the person 400 is viewed from the front. FIG. 5 shows an example in which the ear detection unit 41 detects only a left ear region 30L using the left ear classifier without detecting a right ear region 30R (not illustrated) using the right ear classifier. However, this is an example, and the ear on the right side as viewed from the person 400 may be the right ear and the ear on the left side as viewed from the person 400 may be the left ear.

The hair detection unit 42 detects a hair region including the hair of the person 400 from the image data acquired by the image acquisition unit 121. Hereinafter, details of the processing of detecting the hair region will be described.

First, the hair detection unit 42 detects a face region including at least a part of the face of the person 400 from the image data acquired by the image acquisition unit 121. Specifically, the hair detection unit 42 is only required to detect the face region using a classifier created in advance for detecting the face region. The classifier used here is a Haar-like cascade classifier created in advance for detecting the face region in an open-source image processing library, for example.

Figure 6:
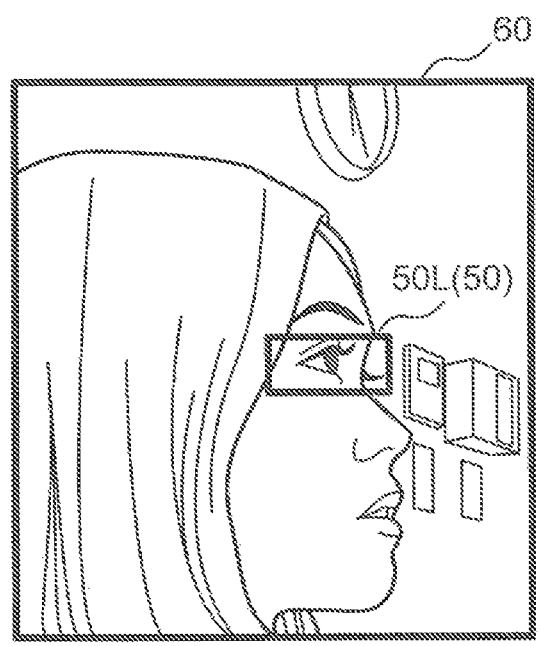
FIG. 6 is a view showing an example of a face region.

FIG. 6 is a view showing an example of a face region 60. As shown in FIG. 6, the face region 60 is a rectangular region having a size enough to include the entire face, for example. However, this is an example, and the shape of the face region 60 may be, for example, a triangle, a pentagon, a hexagon, an octagon, or the like other than a rectangle. Furthermore, the hair detection unit 42 may detect the face region 60 by pattern matching, for example.

Figure 7:
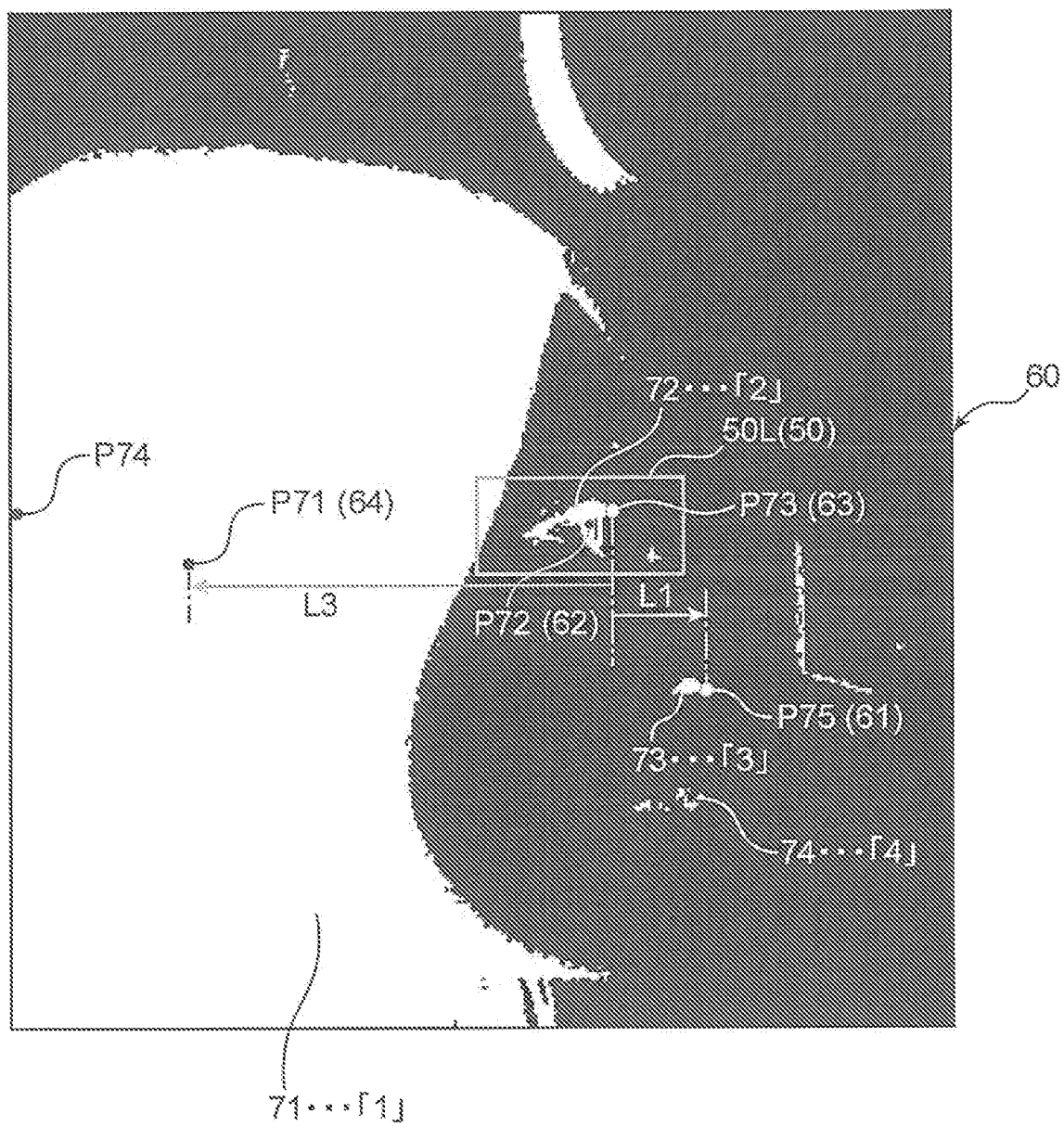
FIG. 7 is a view showing an example of a binarized face region.

Next, the hair detection unit 42 binarizes the detected face region 60. FIG. 7 is a view showing an example of the face region 60 having been binarized. Here, for example, a method called Otsu's binarization is adopted. In addition, a portion where the luminance is lower than a threshold is represented by white, and a portion where the luminance is equal to or higher than the threshold is represented by black.

Next, the hair detection unit 42 performs labeling processing of imparting a labeling number to a white connected region appearing in the binarized face region 60. In the example of FIG. 7, the hair is regarded as one connected region 71, and a labeling number of "1" is imparted to the connected region 71. The left eye is regarded as one connected region 72, and a labeling number of "2" is imparted to the connected region 72. The left nostril is regarded as one connected region 73, and a labeling number of "3" is imparted to the connected region 73. The lip is regarded as one connected region 74, and a labeling number of "4" is imparted to the connected region 74.

Then, the hair detection unit 42 detects, as the hair region, the connected region having the largest area among the labeled connected regions. In the example of FIG. 7, the connected region 71 is detected as a hair region.

The face orientation detection unit 43 detects the face orientation information based on the information indicating the position of one eye included in one eye region 50 of the right eye region 50R or the left eye region 50L detected by the eye detection unit 122 and the information indicating the position of the ear included in the ear region 30 detected by the ear detection unit 41 or the information indicating the position of the hair included in the hair region detected by the hair detection unit 42. The face orientation information includes information indicating whether the face of the person 400 is rightward or leftward, a degree of inclination of the orientation of the face of the person 400 in the right-left direction with respect to the optical axis of the camera 200 (hereinafter, face orientation degree), and the like. Hereinafter, details of the processing of detecting the face orientation information will be described.

First, the face orientation detection unit 43 determines whether the face of the person 400 is rightward or leftward. Specifically, when the left ear region 30L is detected by the ear detection unit 41, the face orientation detection unit 43 determines that the person 400 faces right and determines that the face orientation is rightward. On the other hand, when the right ear region 30R is detected by the ear detection unit 41, the face orientation detection unit 43 determines that the person 400 faces left and determines that the face orientation is leftward. In the example of FIG. 5, since the ear detection unit 41 detects the left ear region 30L, it is determined that the face orientation is rightward.

Note that there is a possibility that the ear detection unit 41 erroneously detects the right ear region 30R and the left ear region 30L. In consideration of the erroneous detection, the face orientation detection unit 43 may be configured as follows. That is, after the ear region 30 is detected by the ear detection unit 41, the face orientation detection unit 43 may detect the face region 60 from the image data acquired by the image acquisition unit 121, similarly to the hair detection unit 42. Then, in the detected face region 60, the face orientation detection unit 43 may determine that the face orientation is rightward when the position of the eye region 50 detected by the eye detection unit 122 is on the right side relative to the ear region 30 detected by the ear detection unit 41, and may determine that the face orientation is leftward when the position of the eye region 50 is on the left side relative to the ear region 30.

In addition, when the position of the center of gravity of the connected region detected as the hair region by the hair detection unit 42 exists in the left half region of the face region 60, the face orientation detection unit 43 determines that the person 400 faces right and determines that the face orientation is rightward. On the other hand, when the position of the center of gravity of the connected region detected as the hair region by the hair detection unit 42 exists in the right half region of the face region 60, the face orientation detection unit 43 determines that the person 400 faces left and determines that the face orientation is leftward. In the example of FIG. 7, since a position P71 of the center of gravity of the connected region 71 detected as the hair region by the hair detection unit 42 exists in the left half region of the face region 60, it is determined that the face orientation is rightward.

Next, based on the image data acquired by the image acquisition unit 121 and the information indicating the position of the eye included in the one eye region 50 detected by the eye detection unit 122, the face orientation detection unit 43 detects a contour point indicating a point on the contour of the face of the person 400 existing on the inner corner of the eye relative to the position of the outer corner of the eye. Hereinafter, details of processing of detecting the contour point when the face is determined to be rightward will be described. Note that the processing of detecting the contour point when the face is determined to be leftward is similar to that when the face is determined to be rightward, and hence the description thereof will be omitted.

Figure 8:
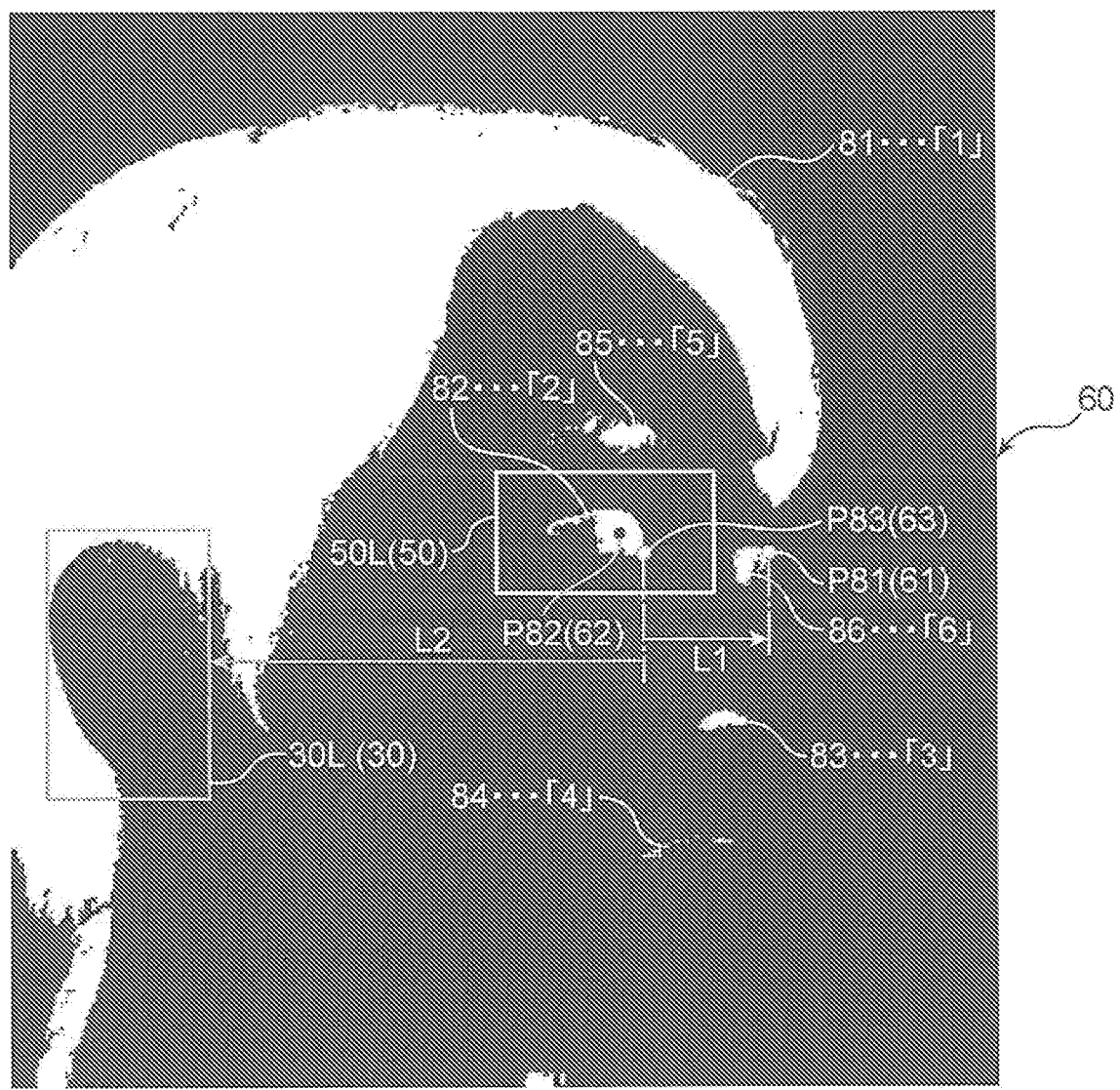
FIG. 8 is a view showing another example of a binarized face region.

First, the face orientation detection unit 43 detects the face region 60 from the image data acquired by the image acquisition unit 121 and binarizes the face region, similarly to the hair detection unit 42. Next, the face orientation detection unit 43 performs labeling processing of imparting a labeling number to a white connected region appearing in the binarized face region 60. FIG. 8 is a view showing another example of the face region 60 having been binarized.

In the example of FIG. 8, the hair is regarded as one connected region 81, and a labeling number of "1" is imparted to the connected region 81. The left eye is regarded as one connected region 82, and a labeling number of "2" is imparted to the connected region 82. The left nostril is regarded as one connected region 83, and a labeling number of "3" is imparted to the connected region 83. The lip is regarded as one connected region 84, and a labeling number of "4" is imparted to the connected region 84. The left eyebrow is regarded as one connected region 85, and a labeling number of "5" is imparted to the connected region 85. A part of the right eye is regarded as one connected region 86, and a labeling number of "6" is imparted to the connected region 86.

Next, from among the labeled connected regions, the face orientation detection unit 43 detects a connected region having an area equal to or smaller than a predetermined area, and being farthest apart from the one eye region 50 detected by the eye detection unit 122 toward the inner corner of the eye included in the one eye region 50. The predetermined area is defined to be, for example, an area about the area of one eye region 50 detected by the eye detection unit 122. In the example of FIG. 8, the face orientation detection unit 43 determines that the face orientation is rightward. Therefore, the face orientation detection unit 43 determines that the eye region 50 detected by the eye detection unit 122 is the left eye region 50L, and the connected region 82 included in the left eye region 50L indicates the left eye. Next, the face orientation detection unit 43 detects the connected region 86 having an area equal to or smaller than a predetermined area, being farthest apart from the left eye region 50L to the right which is the inner corner side of the left eye.

Next, the face orientation detection unit 43 regards that the contour point exists on the detected connected region, and detects the contour point. In the example of FIG. 8, the face orientation detection unit 43 detects the inner corner side of the left eye, i.e., a right end P81 of the detected connected region 86 as a contour point 61.

Next, the face orientation detection unit 43 detects the center of gravity of the eye and the position of the inner corner of the eye from the eye region 50 detected by the eye detection unit 122 as information indicating the position of the eye included in the eye region 50. In the example of FIG. 8, since the face orientation detection unit 43 determines that the face orientation is rightward, it is determined that the eye region 50 detected by the eye detection unit 122 is the left eye region 50L, and the connected region 82 included in the left eye region 50L indicates the left eye. The face orientation detection unit 43 detects a position P82 of the center of gravity of the connected region 82 as a position 62 of the center of gravity of the left eye. Furthermore, the face orientation detection unit 43 detects the inner corner side of the left eye, i.e., a right end P83 of the detected connected region 82 as a position 63 of the inner corner of the left eye.

Next, when the ear region 30 is detected by the ear detection unit 41, the face orientation detection unit 43 calculates the first distance from the position of the inner corner of the eye included in the one eye region 50 detected by the eye detection unit 122 to the contour point 61, and calculates the second distance from the position of the inner corner of the eye to the position of the ear included in the ear region 30 detected by the ear detection unit 41. Then, the face orientation detection unit 43 detects the face orientation information based on the first distance and the second distance.

In the example of FIG. 8, the face orientation detection unit 43 calculates a horizontal distance L1 from the position 63 of the inner corner of the left eye included in the left eye region 50L to the contour point 61 as the first distance (hereinafter, the first distance L1). The face orientation detection unit 43 sets the inner corner side of the left eye, i.e., the right end in the left ear region 30L detected by the ear detection unit 41 as a position of the ear included in the ear region 30. Then, the face orientation detection unit 43 calculates a horizontal distance L2 from the position 63 of the inner corner of the left eye to the position of the ear as the second distance (hereinafter, the second distance L2).

Figure 9:
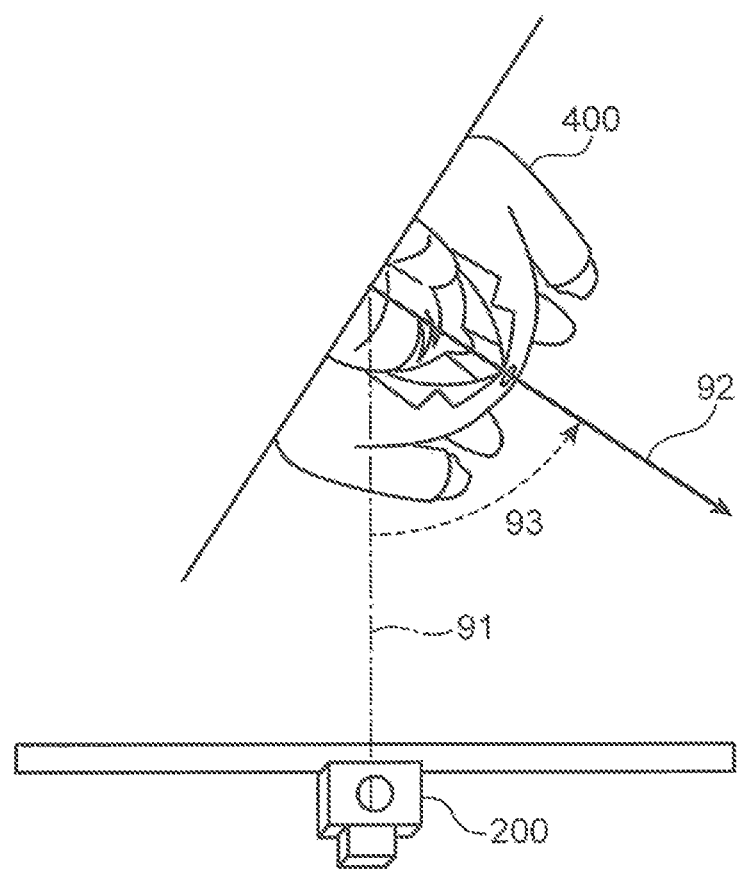
FIG. 9 is a schematic diagram showing an example of a face orientation degree of a person viewed from above.

FIG. 9 is a schematic diagram showing an example of a face orientation degree of the person 400 viewed from above. As shown in FIG. 9, with an increase in the degree to which the person 400 inclines the face orientation in the left-right direction toward the camera 200, the angle (hereinafter, attitude angle) 93 indicating a front direction 92 of the face of the person 400 with respect to an optical axis 91 of the camera 200 increases. In addition, with an increase in the face orientation degree, the first distance L1 from the position of the inner corner of one eye captured by the camera 200 to the contour point decreases, and the second distance L2 from the position of the inner corner of the eye to the position of the ear increases. Therefore, it is possible to define in advance, based on experimental values and the like, a function (hereinafter, the first function) indicating the relationship between an attitude angle 93 indicating the face orientation degree and a ratio of the second distance L2 to the first distance L1 (=L2/L1) or a ratio of the first distance L1 to the second distance L2 (=L1/L2).

Therefore, the face orientation detection unit 43 calculates the ratio of the second distance L2 to the first distance L1, or the ratio of the first distance L1 to the second distance L2. Then, by inputting the calculated ratio to the first function, the face orientation detection unit 43 acquires the attitude angle 93 corresponding to the input ratio as the face orientation degree. The face orientation detection unit 43 detects the thus obtained face orientation degree as face orientation information. The acquisition method of the face orientation degree is not limited thereto. For example, a function indicating the relationship between a difference between the first distance L1 and the second distance L2 and the attitude angle 93 may be defined in advance, and the face orientation degree may be acquired using the function.

It is impossible to detect the ear region 30 from image data of the face of the person 400 whose ear is covered with hair. Therefore, in this case, the face orientation detection unit 43 detects the hair region from the image data of the face of the person 400 using the hair detection unit 42. Next, the face orientation detection unit 43 calculates the first distance L1, and calculates a third distance from the position of the eye included in the one eye region 50 detected by the eye detection unit 122 to a point in the hair region positioned on to the outer corner side of the eye relative to the position of the inner corner of the eye. Then, the face orientation detection unit 43 detects face orientation information based on the first distance L1 and the third distance.

The processing of detecting face orientation information from the hair region will be described below with reference to FIG. 7. In the example of FIG. 7, similarly to the example of FIG. 8, the face orientation detection unit 43 determines that the connected region 72 included in the left eye region SOL indicates the left eye. Then, the face orientation detection unit 43 detects, as the contour point 61, an end P75 on the inner corner side of the left eye in the connected region 73 having an area equal to or smaller than a predetermined area, being farthest apart from the left eye region SOL to the right, which is the inner corner side of the left eye. Furthermore, the face orientation detection unit 43 detects a position P72 of the center of gravity of the connected region 72 indicating the left eye as the position 62 of the center of gravity of the left eye, and detects an end P73 on the inner corner side of the left eye in the connected region 72 as the position 63 of the inner corner of the left eye. Then, the face orientation detection unit 43 calculates the first distance L1, which is a horizontal distance from the detected position 63 of the inner corner of the left eye to the detected contour point 61.

The face orientation detection unit 43 detects the position P71 of the center of gravity of the hair region detected by the hair detection unit 42 as a point 64 in the hair region. The point 64 in the hair region is not limited thereto, and may be a point P74, which is farthest apart, from the position 63 of the inner corner of the left eye included in the left eye region 50l, to the left, which is the outer corner side of the left eye, on the contour of the connected region 71 indicating the hair region. The face orientation detection unit 43 calculates a horizontal distance L3 from the position 63 of the inner corner of the left eye to the point 64 in the hair region as the third distance (hereinafter, the third distance L3).

The face orientation detection unit 43 calculates the ratio of the third distance L3 to the first distance L1 or the ratio of the first distance L1 to the third distance L3, similarly to the example of FIG. 8. Then, by inputting the calculated ratio to a second function similar to the first function, the face orientation detection unit 43 acquires the attitude angle 93 corresponding to the input ratio as the face orientation degree. The second function is a function indicating the relationship between the attitude angle 93 (FIG. 9) and the ratio of the third distance L3 to the first distance L1 or the ratio of the first distance L1 to the third distance L3, and is defined in advance based on experimental values and the like. The face orientation detection unit 43 detects the thus obtained face orientation degree as face orientation information. The acquisition method of the face orientation degree is not limited thereto. For example, a function indicating the relationship between a difference between the first distance L1 and the third distance L3 and the attitude angle 93 may be defined in advance, and the face orientation degree may be acquired using the function.

The one side face eye gaze detection unit 44 performs the second processing of detecting eye gaze information based on the information indicating the position of the eye included in the one eye region 50 detected by the eye detection unit 122 and the face orientation information detected by the face orientation detection unit 43. Hereinafter, details of the second processing will be described.

Figure 10:
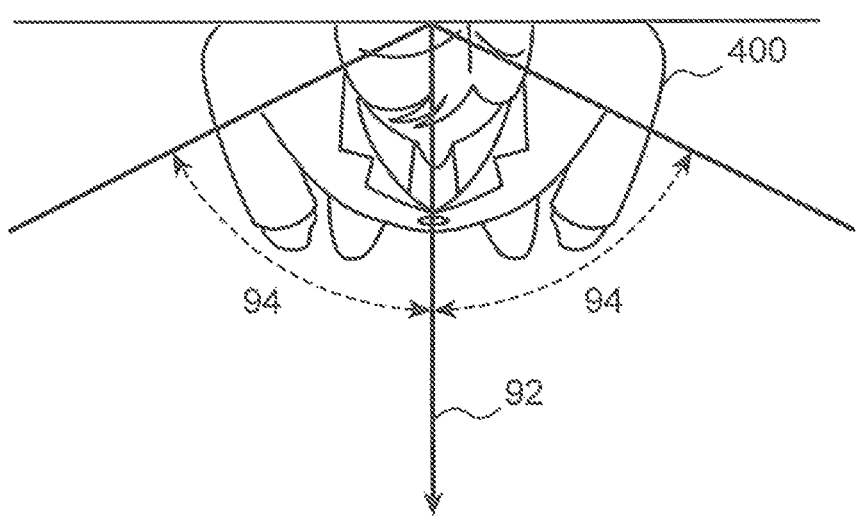
FIG. 10 is a view showing a viewing angle of a person.

FIG. 10 is a view showing a viewing angle 94 of the person 400. In general, it is said that the viewing angle 94 of the eyes of the person 400 falls within a range of equal to or greater than 0 degrees and equal to or less than 60 degrees to the left and right with respect to the front direction 92 of the face of the person 400. Therefore, in the present embodiment, it is assumed that the viewing angle 94 is set to 60 degrees in advance.

In the second processing, the one side face eye gaze detection unit 44 first detects the position of the outer corner of the eye included in the one eye region 50 from the one eye region 50 detected by the eye detection unit 122.

Figure 11:
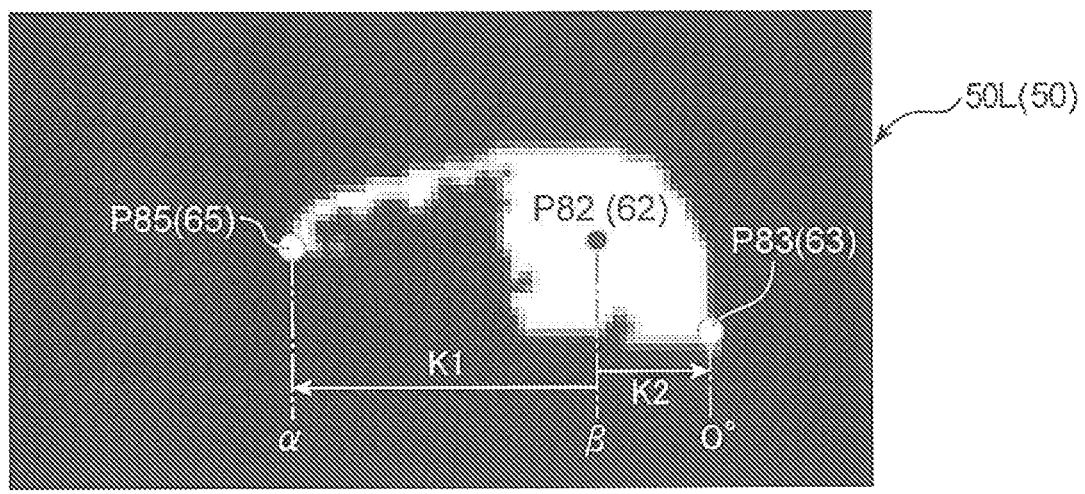
FIG. 11 is an explanatory view of a detection method of an eye gaze direction.

FIG. 11 is an explanatory view of the detection method of an eye gaze direction. FIG. 11 shows an enlarged view of the left eye region 50L shown in FIG. 8. In the example of FIG. 11, the one side face eye gaze detection unit 44 detects, as a position 65 of the outer corner of the left eye, a left end P85 of the connected region 82 determined to indicate the left eye by the face orientation detection unit 43.

The one side face eye gaze detection unit 44 acquires a horizontal distance (hereinafter, the distance between the center of gravity and the outer corner of the eye) from the position 62 of the center of gravity of the eye included in the one eye region 50 detected by the eye detection unit 122 to the position 65 of the outer corner of the eye. Furthermore, the one side face eye gaze detection unit 44 acquires a horizontal distance (hereinafter, the distance between the center of gravity and the inner corner of the eye) from the position 62 of the center of gravity of the eye included in the detected one eye region 50 to the position 63 of the inner corner of the eye. Then, the one side face eye gaze detection unit 44 calculates an angle (hereinafter, eye gaze direction angle) indicating the direction of the eye gaze with respect to the front direction 92 of the face based on the acquired distance between the center of gravity and the outer corner of the eye and distance between the center of gravity and the inner corner of the eye, and the predetermined viewing angle 94.

Specifically, it is considered that as the position 62 of the center of gravity of the eye included in the one eye region 50 detected by the eye detection unit 122 is closer to the position 63 of the inner corner of the eye, the eye gaze of the person 400 is oriented in a direction closer to the front direction 92 of the face. On the other hand, it is considered that as the position 62 of the center of gravity of the eye is closer to the position 65 of the outer corner of the eye, the eye gaze of the person 400 is oriented in a direction away from the front direction 92 of the face, i.e., in a direction closer to a direction away to the left or right by the viewing angle 94 with respect to the front direction 92 of the face.

Therefore, in the example of FIG. 11, the one side face eye gaze detection unit 44 acquires a distance K1 between the center of gravity and the outer corner of the eye, which is a horizontal distance from the position 62 of the center of gravity of the left eye included in the left eye region 50L detected by the eye detection unit 122 to the position 65 of the outer corner of the left eye. Furthermore, the one side face eye gaze detection unit 44 acquires a distance K2 between the center of gravity and the inner corner of the eye, which is a horizontal distance from the position 62 of the center of gravity of the left eye to the position 63 of the inner corner of the left eye. Then, the one side face eye gaze detection unit 44 calculates an eye gaze direction angle θ by the following formula using the acquired distance K1 between the center of gravity and the outer corner of the eye and distance K2 between the center of gravity and the inner corner of the eye, and a value α (=60°) of the viewing angle 94 defined in advance. $\beta = \alpha \times (K2/K1)$.

As an angle indicating the direction of eye gaze with respect to the optical axis 91 of the camera 200, the one side face eye gaze detection unit 44 calculates a value obtained by adding the calculated eye gaze direction angle β to the face orientation degree detected by the face orientation detection unit 43. The one side face eye gaze detection unit 44 detects, as the eye gaze information, the angle indicating the direction of the eye gaze with respect to the optical axis 91 of the camera 200 having been calculated.

Figure 12:
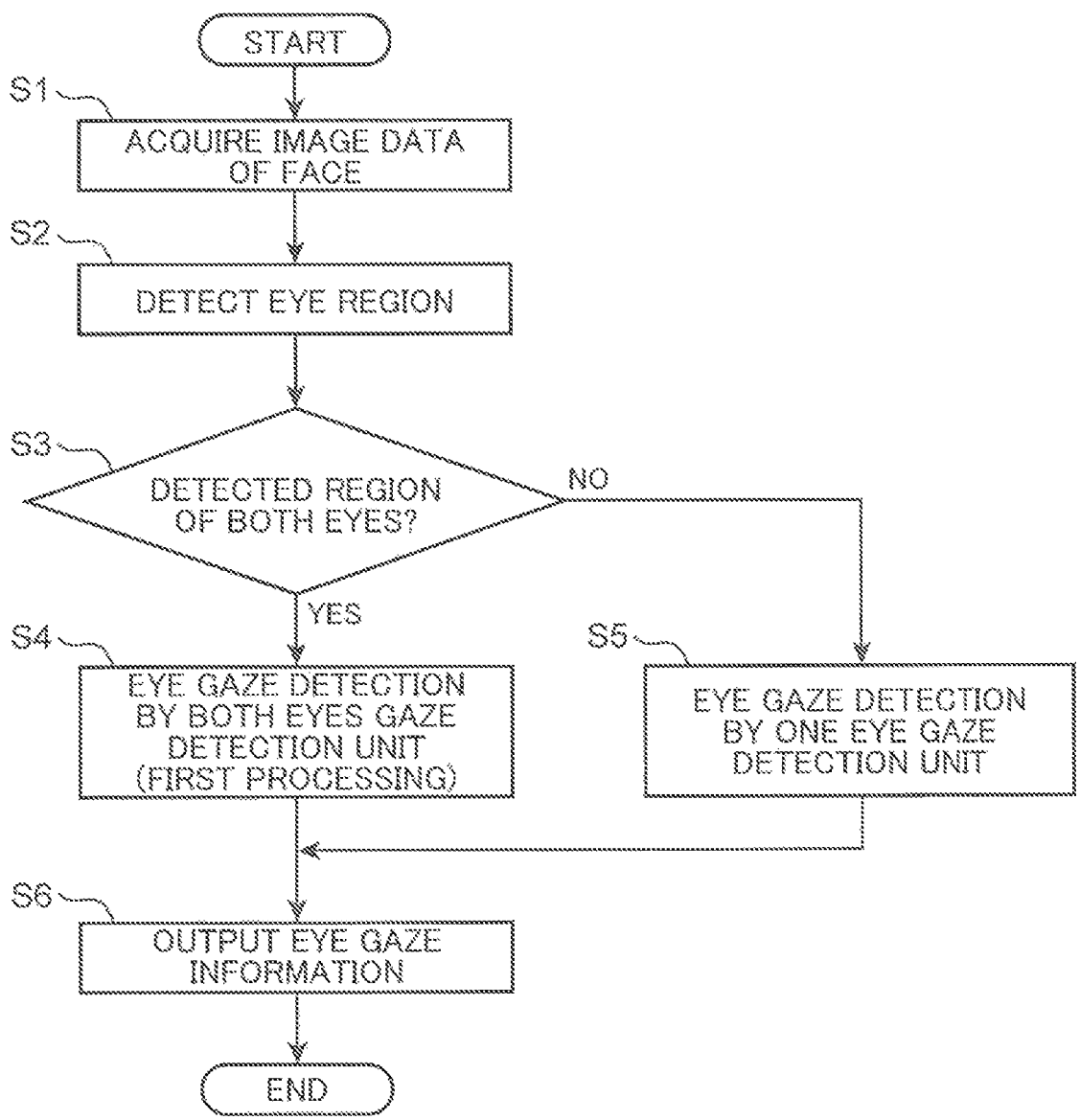
FIG. 12 is a flowchart showing an example of an operation of an image processing device according to the first embodiment.

Next, the operation of the image processing device 100 will be described. FIG. 12 is a flowchart showing an example of the operation of the image processing device 100 according to the first embodiment.

The image acquisition unit 121 acquires image data of the face of the person 400 from the camera 200 (step S1). Next, by inputting the image data acquired in step S1 to a classifier for detecting the eye region 50, the eye detection unit 122 detects the right eye region 50R and the left eye region 50L from the image data (step S2).

In step S2, it is assumed that the right eye region 50R and the left eye region 50L are detected as in the example of FIG. 3 (YES in step S3). In this case, the both eyes gaze detection unit 123 detects the eye gaze information by the first processing using the information indicating the position of the right eye included in the right eye region 50R and the information indicating the position of the left eye included in the left eye region 50L, and the face orientation information detected from the image data acquired in step S1 (step S4).

On the other hand, as in the examples of FIGS. 5 and 6, it is assumed that only one eye region 50 of the right eye region 50R or the left eye region 50L is detected in step S2 (NO in step S3). In this case, the one eye gaze detection unit 124 detects the face orientation information based on the information indicating the position of the eye included in the one eye region 50 and the information indicating the position of a site of the face of the person 400 different from the eye. Then, the one eye gaze detection unit 124 detects the eye gaze information by the second processing using the information indicating the position of the one eye and the detected face orientation information (step S5). Details of the operation of the one eye gaze detection unit 124 in step S5 will be described later.

After step S4 or step S5, the output unit 130 outputs the eye gaze information detected in step S4 or step S5 to the display device 300 (step S6).

Figure 13:
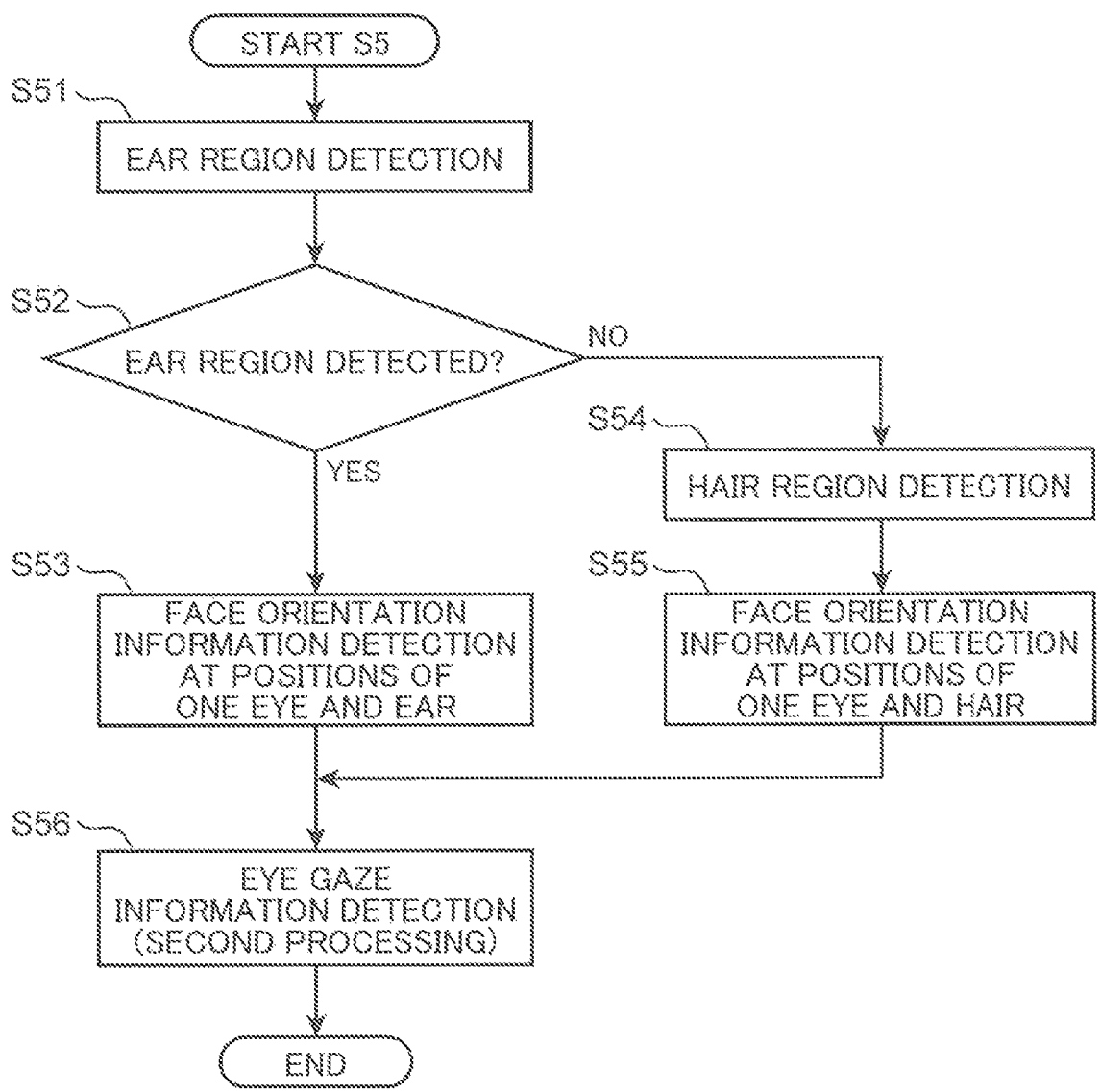
FIG. 13 is a flowchart showing an example of an operation of a one eye gaze detection unit according to the first embodiment.

Next, the operation of the one eye gaze detection unit 124 in step S5 will be described. FIG. 13 is a flowchart showing an example of an operation of the one eye gaze detection unit 124 according to the first embodiment.

When step S5 is started, the ear detection unit 41 detects the ear region 30 from the image data by inputting the image data acquired in step S1 to a classifier for detecting the right ear region and the left ear region (step S51). For example, in step S51, as shown in FIG. 5, the ear detection unit 41 detects the left ear region 30L from the image data acquired in step S1.

If the ear region 30 is detected in step S51 (YES in step S52), the face orientation detection unit 43 detects the face orientation information based on the information indicating the position of the eye included in one eye region 50 detected in step S2 and the information indicating the position of the ear included in the ear region 30 detected in step S51 (step S53).

For example, in step S51, as shown in FIG. 5, it is assumed that the left ear region 30L is detected. In this case, in step S53, since the left ear region 30L is detected in step S51, the face orientation detection unit 43 determines that the face orientation is rightward.

In this case, as shown in FIG. 8, based on the image data acquired in step S1 and the position 63 of the inner corner of the left eye included in the left eye region SOL detected in step S2, the face orientation detection unit 43 calculates the first distance L1, which is a horizontal distance from the position 63 of the inner corner of the left eye to the contour point 61. With the end on the inner corner side of the left eye in the left ear region 30L detected in step S51 as the position of the ear included in the ear region 30, the face orientation detection unit 43 further calculates the second distance L2, which is a horizontal distance from the position 63 of the inner corner of the left eye to the position of the ear.

Then, the face orientation detection unit 43 calculates the ratio of the second distance L2 to the first distance L1 or the ratio of the first distance L1 to the second distance L2, and inputs the calculated ratio to the first function. Thus, the face orientation detection unit 43 acquires the attitude angle 93 (FIG. 9) corresponding to the input ratio as the face orientation degree. The face orientation detection unit 43 detects the thus obtained face orientation degree as face orientation information.

On the other hand, if the ear region 30 is not detected in step S51 (NO in step S52), the face orientation detection unit 43 detects the hair region from the image data acquired in step S1 using the hair detection unit 42 (step S54). For example, as shown in FIG. 7, in step S54, the face region 60 is detected from the image data acquired in step S1 by the hair detection unit 42, and the connected region 71 having the largest area in the region obtained by binarizing the face region 60 is detected as the hair region.

Then, the face orientation detection unit 43 detects the face orientation information based on the information indicating the position of the eye included in the one eye region 50 detected in step S2 and the information indicating the position of the hair included in the hair region detected in step S54 (step S55).

For example, it is assumed that the connected region 71 is detected as the hair region in step S54 as shown in FIG. 7. In this case, in step S55, since the position P71 of the center of gravity of the connected region 71 detected as the hair region exists in the left half region of the face region 60 as described above, the face orientation detection unit 43 determines that the face orientation is rightward.

In this case, as shown in FIG. 7, based on the image data acquired in step S1 and the position 63 of the inner corner of the left eye included in the left eye region 50L detected in step S2, the face orientation detection unit 43 calculates the first distance L1, which is a horizontal distance from the position 63 of the inner corner of the left eye to the contour point 61. Furthermore, with the position P71 of the center of gravity of the hair region detected in step S54 as the point 64 in the hair region, the face orientation detection unit 43 calculates the third distance L3, which is a horizontal distance from the position 63 of the inner corner of the left eye to the point 64 in the hair region.

Then, the face orientation detection unit 43 calculates the ratio of the third distance L3 to the first distance L1 or the ratio of the first distance L1 to the third distance L3, and inputs the calculated ratio to the second function. Thus, the face orientation detection unit 43 acquires the attitude angle 93 (FIG. 9) corresponding to the input ratio as the face orientation degree. The face orientation detection unit 43 detects the thus obtained face orientation degree as face orientation information.

After step S53 or step S55, the one side face eye gaze detection unit 44 detects the eye gaze information by the second processing using the information indicating the position of the eye included in the one eye region 50 detected in step S2 and the face orientation information detected in step S53 or step S55 (step S56).

For example, in step S56, as shown in FIG. 11, the one side face eye gaze detection unit 44 acquires the distance K1 between the center of gravity and the outer corner of the eye, which is a horizontal distance from the position 62 of the center of gravity of the left eye included in the left eye region 50L detected in step S2 to the position 65 of the outer corner of the left eye. Furthermore, the one side face eye gaze detection unit 44 acquires a distance K2 between the center of gravity and the inner corner of the eye, which is a horizontal distance from the position 62 of the center of gravity of the left eye to the position 63 of the inner corner of the left eye. Then, the one side face eye gaze detection unit 44 calculates an eye gaze direction angle $\beta$ by the above-described formula ($\beta = \alpha \times (K2/K1)$) using the acquired distance K1 between the center of gravity and the outer corner of the eye and distance K2 between the center of gravity and the inner corner of the eye, and a value $\alpha$ (=60°) of the viewing angle 94 defined in advance. The one side face eye gaze detection unit 44 detects, as the eye gaze information, a value obtained by adding the calculated eye gaze direction angle $\beta$ to the face orientation degree detected as the face orientation information in step S53 or step S55.

As described above, according to the present embodiment, when only one eye region 50 of the right eye region 50R or the left eye region 50L is detected from the image data of the face, at least one of the ear region 30 and the hair region is detected from the image data of the face. Then, the face orientation information is detected based on the information indicating the position of the eye included in the one eye region 50 and the information indicating the position of the ear or hair included in at least one of the detected ear region 30 and hair region. Then, the eye gaze information is detected based on the detected face orientation information and the information indicating the position of the eye.

Thus, even in a case where only the image data of the face including only the right eye or the left eye can be acquired, the face orientation information can be accurately detected based on the positional relationship between the ear or hair and the detected one eye instead of the positional relationship between both eyes. As a result, the present configuration can accurately specify the orientation of the face, even in a case where only one eye can be detected from the face image, and can eventually improve the eye gaze detection accuracy.

A case where the hair region cannot be detected in step S54 is also conceivable. In this case, the output unit 130 may output, to the display device 300, an error message indicating that the eye gaze information cannot be detected. Alternatively, assuming that one eye detectable from the face image and one eye undetectable from the face image both face substantially the same direction, the processing of step S4 (FIG. 12) and subsequent steps may be performed.

Second Embodiment

Figure 14:
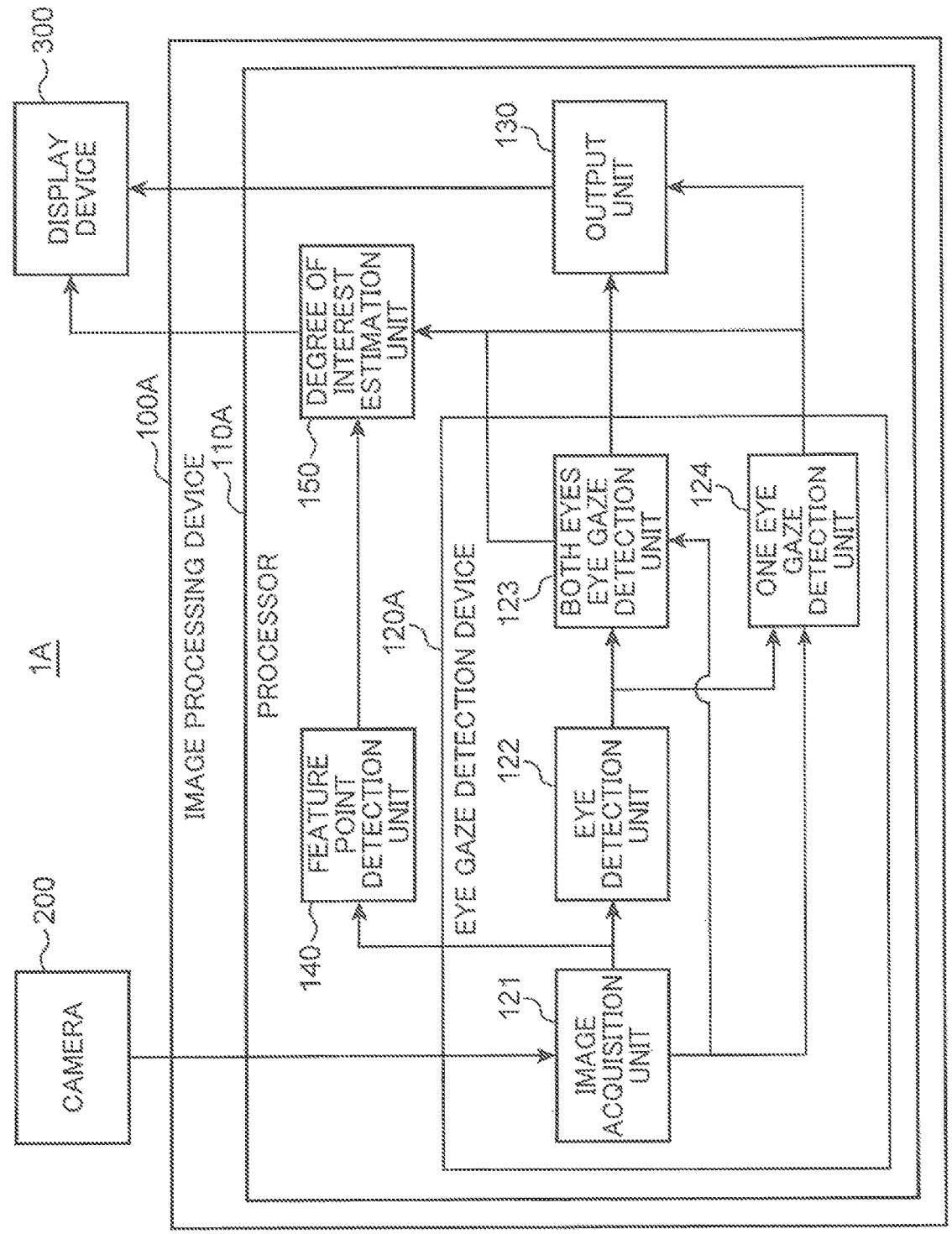
FIG. 14 is a block diagram showing an example of a detailed configuration of the image processing system according to a second embodiment.

In the second embodiment, the degree of interest of the person 400 is estimated. FIG. 14 is a block diagram showing an example of a detailed configuration of the image processing system 1A according to the second embodiment. In the present embodiment, identical components as those in the first embodiment are given identical reference numerals, and description thereof will be omitted. Furthermore, in FIG. 14, a block having an identical name as that in FIG. 2 but having a different function is given a reference sign A at the end.

An eye gaze detection device 120A further includes a feature point detection unit 140 and a degree of interest estimation unit 150.

Similarly to the hair detection unit 42 (FIG. 3), the feature point detection unit 140 detects the face region 60 including at least a part of the face of the person 400 using a classifier created in advance for detecting the face region from the image data acquired by the image acquisition unit 121. Then, the feature point detection unit 140 detects a facial feature point from the detected face region 60. The facial feature point is one or a plurality of points at characteristic positions in each of a plurality of parts constituting the face such as the outer corner of the eye, the inner corner of the eye, the contour of the face, the ridge of the nose, the corner of the mouth, and the eyebrow, for example. The feature point is also called a landmark. The feature point detection unit 140 is only required to detect a facial feature point by executing landmark detection processing using a model file of a framework of machine learning, for example.

The degree of interest estimation unit 150 estimates the degree of interest of the person 400 by the following processing. First, the degree of interest estimation unit 150 detects the eyebrow and the corner of the mouth from the face region 60 using the facial feature point detected by the feature point detection unit 140. Here, in the facial feature point detected by the feature point detection unit 140, the degree of interest estimation unit 150 is only required to detect the eyebrow and the corner of the mouth by specifying the feature points to which landmark point numbers respectively corresponding to the eyebrow and the corner of the mouth are imparted.

Next, the degree of interest estimation unit 150 estimates the degree of interest of the person 400 based on the eye gaze information detected by the both eyes gaze detection unit 123 or the one eye gaze detection unit 124 and the position of the eyebrow and the position of the corner of the mouth having been detected, and outputs the degree of interest to the display device 300. Specifically, the degree of interest estimation unit 150 acquires, from a memory (not illustrated) for example, pattern data in which standard positions of the eyebrow and the corner of the mouth when a person puts on various expressions such as joy, surprise, anger, sadness, and blankness are described in advance. Then, the degree of interest estimation unit 150 collates the detected positions of the eyebrow and the corner of the mouth of the person 400 with the pattern data, and estimates the expression of the person 400. Then, using the estimated expression of the person 400 and the eye gaze indicated by the eye gaze information, the degree of interest estimation unit 150 specifies what expression the person 400 has made when the eye gaze of the person 400 is in which direction or the eye gaze point of the person 400 is present in which position. That is, the degree of interest estimation unit 150 specifies, as the degree of interest of the person 400, data in which the eye gaze information and the expression of the person 400 are associated with each other. Note that, the degree of interest estimation unit 150 is described here to estimate the degree of interest based on the eyebrow and the corner of the mouth, but this is an example, and the degree of interest may be estimated based on one of the eyebrow and the corner of the mouth.

As described above, according to the present embodiment, since the degree of interest of the person 400 is estimated by further using the eyebrow and the corner of the mouth in addition to the eye gaze information, the degree of interest can be estimated with higher accuracy as compared with the degree of interest estimation based only on the eye gaze information.

(Modifications)

(1) If an infrared light camera is adopted as the camera 200, the infrared light camera is only required to be an infrared light camera using infrared light in a predetermined second wavelength band in which the spectral intensity of sunlight is attenuated more than a predetermined first wavelength. The predetermined first wavelength is, for example, 850 nm. The predetermined second wavelength is, for example, 940 nm. The second wavelength band does not include, for example, 850 nm and is a band having a predetermined width with 940 nm as a reference (e.g., the center). As an infrared light camera that captures near-infrared light, one that uses infrared light of 850 nm is known. However, since the spectral intensity of sunlight is not sufficiently attenuated at 850 nm, there is a possibility that highly accurate eye gaze information detection cannot be performed outdoors where the spectral intensity of sunlight is strong. Therefore, as an infrared light camera, the present disclosure employs a camera that uses infrared light in a band of 940 nm, for example. This makes it possible to perform highly accurate eye gaze information detection even outdoors where the spectral intensity of sunlight is strong. Here, the predetermined second wavelength is 940 nm, but this is an example, and may be a wavelength slightly shifted from 940 nm. Note that the infrared light camera using the infrared light of the second wavelength is, for example, a camera including a light projector that irradiates with the infrared light of the second wavelength.

(2) In the above embodiment, the eye gaze information is described to include the coordinate data indicating the eye gaze point, but the present disclosure is not limited thereto. For example, the eye gaze information may include coordinate data indicating an eye gaze plane that is a region having a predetermined shape (e.g., a circle, a quadrangle, or the like) with a predetermined size with the eye gaze point as a reference (e.g., the center). This makes it possible to appropriately determine the eye gaze target object without depending on the distance between the person 400 and the eye gaze target object or the size of the eye gaze target object.

INDUSTRIAL APPLICABILITY

Since the present disclosure can detect eye gaze information with high accuracy, the present disclosure is useful in estimation of a person's interest target using eye gaze information, estimation of a person's state, a user interface using an eye gaze, and the like.

The invention claimed is:

1. An eye gaze detection method in an eye gaze detection device, the eye gaze detection method comprising:
    acquiring image data of a face of a person;
    detecting, from the image data of the face, a left eye region including a left eye of the person and a right eye region including a right eye of the person;
    detecting, from the image data of the face, a certain site of the face existing on an outer corner of one eye relative to a position of an inner corner of the one eye, wherein the certain site includes an ear region including an ear of the person or a hair region including hair of the person, when only one eye region of the right eye region or the left eye region is detected;
    detecting a contour point indicating a point on a contour of the face existing on the inner corner of the one eye relative to a position of the outer corner of the one eye based on the image data of the face and information indicating a position of the one eye;
    detecting information indicating an orientation of the face based on a first distance from the position of the one eye to the contour point and a second distance from the position of the one eye to a position of the certain site; and
    detecting information indicating an eye gaze of the person based on the information indicating the position of the one eye and the information indicating the orientation of the face.

2. The eye gaze detection method according to claim 1, comprising:
    detecting the ear region from the image data of the face when only the one eye region is detected; and
    detecting information indicating an orientation of the face based on the first distance from the position of the one eye to the contour point and the second distance from the position of the one eye to the position of the certain site.

3. The eye gaze detection method according to claim 2, comprising:
    detecting the hair region from the image data of the face when having failed to detect the ear region, and
    detecting information indicating an orientation of the face based on the information indicating the position of the one eye and the information indicating the position of the hair.

4. The eye gaze detection method according to claim 1, wherein
    the certain site includes the hair region including hair of the person, the eye gaze detection method comprising:
    detecting information indicating an orientation of the face based on the first distance from the position of the one eye to the contour point and the second distance from the position of the one eye to a point in the hair region.

5. The eye gaze detection method according to claim 1, comprising:
    detecting information indicating an orientation of the face from the image data of the face when the right eye region and the left eye region are detected; and
    detecting information indicating an eye gaze of the person based on information indicating a position of a right eye included in the right eye region and a position of a left eye included in the left eye region and the information indicating the orientation of the face.

6. An eye gaze detection device comprising a processor configured to perform:
    acquiring image data of a face of a person;
    detecting, from the image data of the face, a left eye region including a left eye of the person and a right eye region including a right eye of the person;
    detecting, from the image data of the face, a certain site of the face existing on an outer corner of one eye relative to a position of an inner corner of the one eye, wherein the certain site includes an ear region including an ear of the person or a hair region including hair of the person, when only one eye region of the right eye region or the left eye region is detected;
    detecting a contour point indicating a point on a contour of the face existing on the inner corner of the one eye relative to a position of the outer corner of the one eye based on the image data of the face and information indicating a position of the one eye and detecting information indicating an orientation of the face based on a first distance from the position of the one eye to the contour point and a second distance from the position of the one eye to a position of the certain site; and
    detecting information indicating an eye gaze of the person based on the information indicating the position of the one eye and the information indicating the orientation of the face.

7. A non-transitory computer readable storage medium storing a control program for an eye gaze detection device, the control program causing a computer included in the eye gaze detection device to execute:
    acquiring image data of a face of a person;
    detecting, from the image data of the face, a left eye region including a left eye of the person and a right eye region including a right eye of the person;
    detecting, from the image data of the face, a certain site of the face existing on an outer corner of one eye relative to a position of an inner corner of the one eye, wherein the certain site includes an ear region including an ear of the person or a hair region including hair of the person, when only one eye region of the right eye region or the left eye region is detected;
    detecting a contour point indicating a point on a contour of the face existing on the inner corner of the one eye relative to a position of the outer corner of the one eye based on the image data of the face and information indicating a position of the one eye and detecting information indicating an orientation of the face based on a first distance from the position of the one eye to the contour point and a second distance from the position of the one eye to a position of the certain site; and
    detecting information indicating an eye gaze of the person based on the information indicating the position of the one eye and the information indicating the orientation of the face.

* * * * *